United States Patent [19]
Murata

[11] Patent Number: 5,125,486
[45] Date of Patent: Jun. 30, 1992

[54] FLUID POWER TRANSMISSION WITH A LOCK-UP CLUTCH

[75] Inventor: Kiyohito Murata, Susono, Japan

[73] Assignee: Toyota Jidosha Kabushiki Kaisha, Toyota, Japan

[21] Appl. No.: 752,089

[22] Filed: Aug. 29, 1991

[30] Foreign Application Priority Data

Aug. 31, 1990 [JP] Japan ............................... 2-230325
Nov. 28, 1990 [JP] Japan ............................... 2-326527

[51] Int. Cl.$^5$ ...................... F16D 33/00; F16D 39/00
[52] U.S. Cl. .................................. 192/3.26; 192/48.3; 192/58 B; 192/85 A
[58] Field of Search ................... 192/3.26, 3.25, 3.28, 192/48.3, 58 B, 59, 85 A

[56] References Cited

U.S. PATENT DOCUMENTS

| | | | |
|---|---|---|---|
| 2,707,408 | 5/1955 | Ahlen | 192/3.26 X |
| 4,423,803 | 1/1984 | Malloy | 192/3.29 |
| 4,473,145 | 9/1984 | Bopp | 192/3.29 |
| 4,493,406 | 1/1985 | Bopp | 192/3.28 X |
| 4,496,034 | 1/1985 | Bopp | 192/3.28 |
| 4,540,076 | 9/1985 | Bopp | 192/58 B |
| 4,557,357 | 12/1985 | Tinholt | 192/3.21 |
| 4,643,283 | 2/1987 | Wonn | 192/3.33 |
| 4,690,256 | 1/1987 | Bopp et al. | 192/3.28 X |

FOREIGN PATENT DOCUMENTS

| | | | |
|---|---|---|---|
| 58-34262 | 2/1983 | Japan . | |
| 61-157746 | 9/1986 | Japan . | |
| 61-252964 | 11/1986 | Japan . | |
| 62-45459 | 3/1987 | Japan . | |
| 1-206126 | 8/1989 | Japan | 192/48.3 |
| 2216966 | 10/1989 | United Kingdom . | |
| 2216966 | 10/1989 | United Kingdom . | |
| WO89/7725 | 8/1989 | World Int. Prop. O. | 192/3.25 |

OTHER PUBLICATIONS

Simon C. Y. Tung & James L. Linden, SAE Technical Paper Series 850,459, Modeling Torque Converter Clutch Viscous Damper Performance, Feb. 25–Mar. 1, 1985.

Primary Examiner—Rodney H. Bonck
Assistant Examiner—Andrea Pitts
Attorney, Agent, or Firm—Kenyon & Kenyon

[57] ABSTRACT

A fluid power transmission which comprises: a pump impeller; a turbine runner; a housing accommodating the pump impeller and the turbine runner; a lock-up clutch adapted to be engaged with and released from a front cover integrated with the pump impeller; and a viscous coupling including an annular drive member and an annular driven member for transmitting torque inbetween through viscous fluid. The drive member is connected to the lock-up clutch, whereas the driven member is connected to a hub which is integrated with the turbine runner. Further comprised is a second clutch which is engaged, after the lock-up clutch has been engaged, to connect the drive member and the driven member mechanically.

26 Claims, 12 Drawing Sheets

FLUID POWER TRANSMISSION WITH A LOCK-UP CLUTCH

BACKGROUND OF THE INVENTION

The present invention relates to a fluid power transmission such as a fluid coupling transmission or torque converter with a lock-up clutch.

In the fluid power transmission such as the torque converter, the power is transmitted from the pump impeller to the turbine runner. As a result, a difference in rotations between the pump impeller and the turbine runner cannot be avoided to lose the power. In order to prevent this power loss, therefore, there has been developed and widely adopted a torque converter which is equipped with a lock-up clutch for providing a mechanical coupling between an input side member (e.g., the front cover) and an output side member (e.g., the turbine runner hub).

If the lock-up clutch is engaged, the power is transmitted directly, as it is, from the input side member to the output side member so that no power loss is caused to improve the fuel economy or mileage.

However, the vibrations, if any, due to the torque fluctuations of the engine may be transmitted to deteriorate the riding comfort of the vehicle. In the transmission such as the torque converter for transmitting the torque through fluid, this fluid exerts a buffer action or a vibration attenuating action. If, however, the lock-up clutch is engaged, the input side member and the output side member are directly connected. With this direct connection, the engine vibrations or the torque fluctuations are transmitted as they are to the automatic transmission. Generally in the prior art, the lock-up clutch is not engaged unless the vehicle speed is higher than a predetermined level and unless the degree of throttle opening is less than a predetermined level, so that the riding comfort of the vehicle may not be deteriorated by the engine vibrations, the vibrations due to the torque fluctuations or the booming noise caused by those vibrations. As a result, the effect of improving the mileage by engaging the lock-up clutch cannot be achieved in the range of a low vehicle speed and a high degree of throttle opening.

In the lock-up range being generally executed in the prior art, on the other hand, the booming noise may occur at a relatively low vehicle speed or at a relatively high degree of throttle opening.

With a view to attenuating the vibrations in the lock-up state, therefore, there is known in the prior art a system, which is equipped on a power transmission passage through the lock-up clutch with a slip torque transmission mechanism such as the viscous coupling.

This slip torque transmission mechanism is one for transmitting the torque while allowing relative rotations and is represented by the viscous coupling. This representative is exemplified by a torque converter with a viscous coupling, as disclosed in U.S. Pat. No. 4,473,145. This torque converter, as generally designated at 1, is constructed, as shown in FIG. 12, to have its housing 2 composed of the casing of a pump impeller 3 and a front cover 2a. The torque converter 1 is equipped in the housing with the pump impeller 3, a turbine runner 4, a disc-shaped driven member 5 connected integrally to the turbine runner 4, and a disc-shaped drive member 6 made independently rotatable and axially slidable. These drive and driven members 6 and 5 have their opposed surfaces with a number of annular projections 6a and 5a which have tooth-shaped sections to interleave each other. In the clearance between these opposed driven and drive members 5 and 6, there is confined highly viscous oil such as silicone oil to constitute a viscous coupling 7.

Moreover, the disc-shaped drive member 6 is equipped on its circumferential edge with a friction member 9a, which is brought into and out of engagement with the front cover 2a by the drive member 6 when this member 6 is axially moved back and forth. Thus, a lock-up clutch 9 is provided. On the other hand, the aforementioned driven member 5 is splined to the output shaft 10 of the torque converter 1 so that it is integrally connected to the output shaft 10.

In the torque converter 1 shown in FIG. 12, therefore, most of the power is transmitted, when the lock-up clutch 9 is engaged, from the front cover 2a to the drive member 6 of the viscous coupling 7 and is further transmitted from the drive member through the viscous fluid to the driven member 5 until it is outputted to the output shaft 10 of the torque converter 1 rotating integrally with the driven member 5. In this case, the torque fluctuations and vibrations of the engine are also transmitted to the front cover 2a and the drive member 6 but are not transmitted to the driven member 5 due to the so-called "slippage" of the viscous coupling 7 and by the vibration attenuating action of the highly viscous fluid. As a result, the booming noise is prevented to prevent the deterioration of the riding comfort.

In the aforementioned torque converter having the lock-up clutch equipped with the viscous coupling, therefore, the vibrations or the like can be effectively cut by the slippage of the viscous coupling even if the lock-up range is expanded to either a low vehicle speed range, in which the engine torque highly fluctuates, or to a high degree range of the throttle opening. Despite of this advantage, however, the viscous coupling will slip even at a high-speed cruising of the vehicle, in which the torque fluctuations of the engine are so low that no slippage is required. Thus, the high loss of the torque transmission raises a problem that the mileage is accordingly degraded.

SUMMARY OF THE INVENTION

A major object of the present invention is to improve the characteristics of attenuating the booming noise and vibrations in low and medium speed ranges and to improve the power transmission efficiency in a high speed range.

Another object of the present invention is to hold constant the timing of engagement of clutch means which is arranged in parallel relationship with the viscous coupling.

According to the present invention, therefore, there is provided a fluid power transmission which comprises: a pump impeller; a turbine runner; a housing accommodating said pump impeller and said turbine runner; a lock-up clutch adapted to be engaged with and released from a first member integrated with said pump impeller; and a viscous coupling including an annular drive member and an annular driven member for transmitting torque inbetween through viscous fluid, said drive member being connected to said lock-up clutch, and said driven member being connected to a second member integrated with said turbine runner, wherein the improvement comprises clutch means adapted to be engaged, after said lock-up clutch has been engaged, to connect said drive member and said driven member mechanically.

The clutch means is exemplified either by a cone clutch having a taper surface contacting for transmitting the torque or by a multiple disc clutch having a plurality of friction plates contacting with each other.

Moreover, the viscous coupling can be constructed such that annular projections having either their inner and outer circumferences tapered are interleaved with a clearance which is filled up with viscous fluid.

There can be provided a pressure absorbing mechanism which is enable to increase the substantial capacity of a chamber by confining the viscous fluid together with gases such as air in the chamber.

The above and further objects and novel features of the present invention will more fully appear from the following detailed description when the same is read with reference to the accompanying drawings. It is to be expressly understood, however, that the drawings be for the purpose of illustration only and be not intended as a definition of the limits of the present invention.

BRIEF DESCRIPTION OF THE DRAWINGS

FIG. 1 is a sectional side elevation showing a torque converter and a viscous coupling;

FIG. 2 is an explanatory view showing the state in which a lock-up clutch is engaged;

FIG. 3 is an explanatory view showing the state in which the viscous coupling has its torque transmission capacity augmented; and FIG. 4 is an explanatory view showing the state in which a cone clutch is engaged.

DESCRIPTION OF THE PREFERRED EMBODIMENTS

Figure 1:
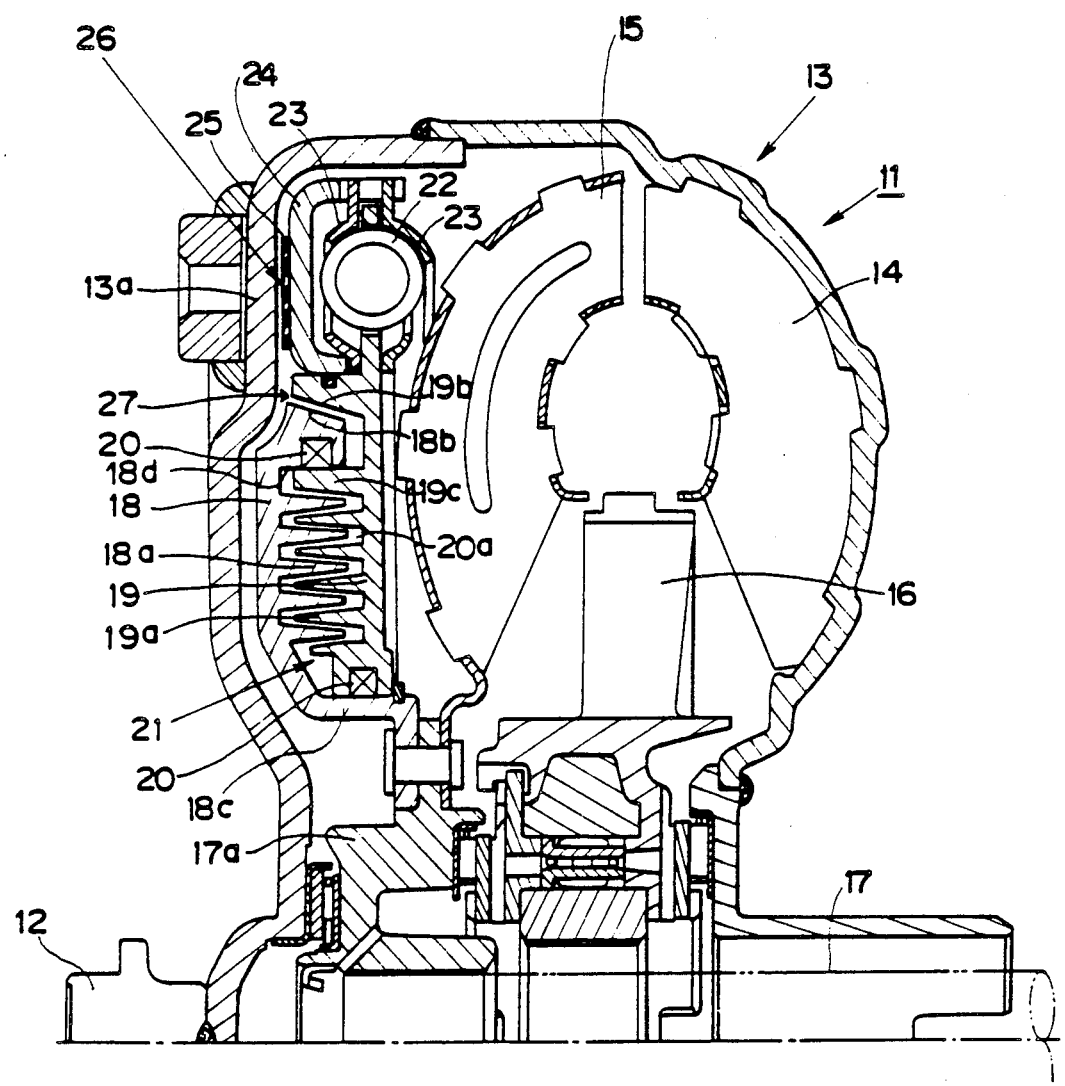
In FIGS. 1 to 4 showing a first embodiment of the present invention.

In FIGS. 1 to 4 showing a first embodiment, a torque converter 11 equipped with a lock-up mechanism has its housing 13 formed of a front cover 13a and the casing of a pump impeller 14. In the housing 13, there are disposed: a turbine runner 15 for receiving torque transmitted from the pump impeller 14 through AT oil; and a stator 16 for regulating the flow direction of the AT oil filling up the inside of the housing 13. Moreover, the turbine runner 15 is fixed on a hub 17a which is splined to an output shaft 17. The hub 17a fixes thereon a disc-shaped driven member 18 between the turbine runner 15 and the front cover 13a.

This driven member 18 is formed in its inner circumferential portion with a cylinder portion 18c and in its outer circumferential portion with another cylinder portion 18d having a cylindrical inner surface.

Between the driven member 18 and the turbine runner 15, moreover, there is interposed an annular drive member 19 which can move in the axial directions. Specifically, the drive member 19 is slidably fitted on the outer surface of the cylinder portion 18c of the driven member 18 and is formed at its radially middle portion with a cylinder portion 19c, which is slidably fitted in the inner surface of the other cylinder portion 18d of the driven member 18. Moreover, the driven member 18 and the drive member 19 have their opposed surfaces formed with a number of concentric projections 18a and 19a which are shaped to have comb teeth and interleaved each other. These projections 18a and 19a are shaped, as shown, to have taper sections so that their clearance becomes the narrower and their lap length becomes the longer as their meshing depth becomes the larger.

Between the opposed driven member 18 and drive member 19, there is formed a chamber 20a which has its inner and outer circumferences sealed by X-type seals 20. The chamber 20a has its inside filled up with not only the highly viscous oil such as silicone oil but also a suitable amount of air, to form a variable capacity type viscous coupling 21. If the driven member 18 and the drive member 19 get close to each other, the highly viscous oil confined inbetween is pressurized to narrow the clearance between their two projections 18a and 19a. As a result, the shearing resistance of the highly viscous oil is augmented, and the lap length of the projections 18a and 19a increased, so that the torque transmission capacity of the viscous coupling 21 increases.

On the circumferential edge of the aforementioned annular drive member 19, there are supported a plurality of coil springs 22 constituting a torsional damper mechanism by spring guide plates 23, so that the coil springs 22 may damp the rotational fluctuations of the drive member 19 to suppress the vibrations. On the spring guide plates 23, moreover, there are supported an annular clutch disc 24 of C-shaped section, which is allowed to move in the axial directions. A facing member 25 is adhered to the outer surface (as located at the lefthand side of FIG. 1) of the clutch disc 24. Thus, this clutch disc 24 and the front cover 13a of the housing 13 form together a lock-up clutch 26.

The engagement and release of the lock-up clutch 26 thus constructed is hydraulically controlled in accordance with a predetermined lock-up map.

If a half lock-up range is reached, the oil pressure at the side of the turbine runner 15 is raised to depress the clutch disc 24. As a result, the clutch disc 24 comes into engagement with the inner surface of the front cover 13a to apply the lock-up clutch 26.

If the lock-up clutch 26 is applied this half lock-up range, the torque being transmitted through the torque converter 11 is partially transmitted directly to the drive member 19. As a result, the torque of this drive member 19 is transmitted through the highly viscous oil to the driven member 18 to rotate the output shaft 17. At the time of torque fluctuations of the engine (although not shown), the viscous coupling 21 will slip to attenuate the vibrations or the like so that the vibrations are prevented from being transmitted from the viscous coupling 21 to the downstream power transmission line.

Moreover, the disc-shaped driven and drive members 18 and 19 constituting the viscous coupling 21 are formed at their individual circumferential edges with opposed taper surfaces 18b and 19b, respectively. These taper surfaces 18b and 19b constitute together a cone clutch 27, which is applied when the taper surfaces 18b and 19b are brought into contact with each other. Thus, the driven member 18 and the drive member 19 can be mechanically connected without any slippage by the cone clutch 27.

Next, the operations of the present embodiment thus made will be described in the following with reference to FIGS. 2 to 4.

When the torque of the engine is transmitted to the front cover 13a, the pump impeller 14 is rotated to transmit its torque to the turbine runner 15 through the AT oil. At a low-speed run or at an acceleration outside of the lock-up range, the torque transmission is accomplished through the AT oil. Moreover, the torque fluctuations, if any, of the engine and the resultant vibrations are absorbed through the slippage of the torque converter 11 so that their transmissions to the power transmission line downstream of the torque converter 11 are cut.

Figure 2:
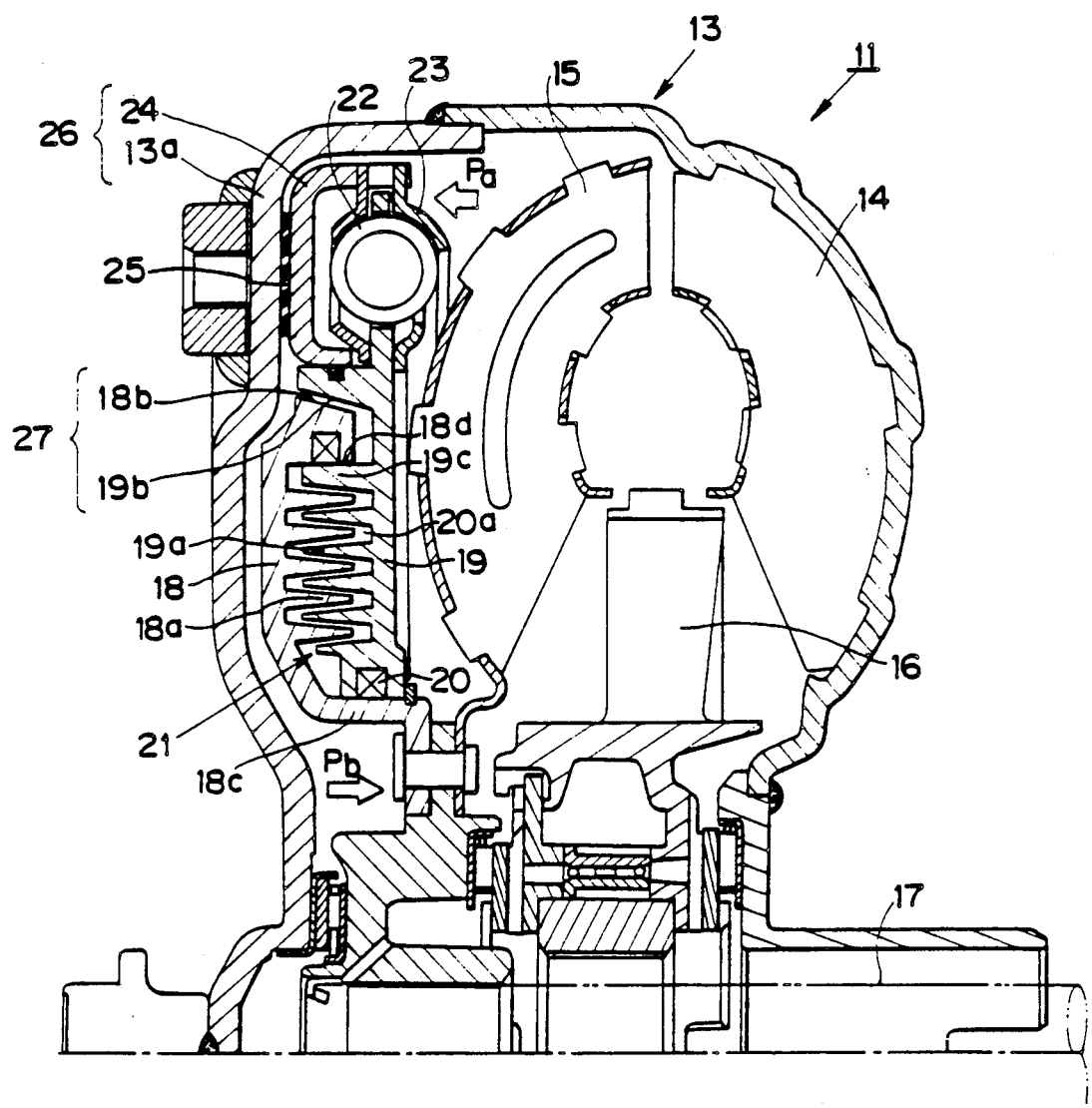

When the vehicle state reaches the half lock-up range as the vehicle speed slightly increases or as the degree of throttle opening slightly decreases, an oil pressure Pa at the side of the turbine runner 15 is at first boosted to push the annular clutch disc 24 leftward of FIG. 1 so that the facing member 25 adhered to the clutch disc 24 is forced to contact with the circumferential edge of the inner side of the front cover 13a thereby to apply the lock-up clutch 26 (as shown in FIG. 2).

When this lock-up clutch 26 is applied, the shocks at this time are buffered by the coil spring 22 of the torsional damper mechanism, which is interposed between the drive member 19 of the viscous coupling 21 and the clutch disc 24 of the lock-up clutch 26. As a result, the torque is transmitted from the front cover 13a to start the rotation of the drive member 19. This rotational torque is transmitted through the highly viscous oil in the variable capacity type viscous coupling 21 to the driven member 18 until it is outputted to the output shaft 17. At this time, the torque transmission capacity is small because of the wide clearance between the drive member 19 of the viscous coupling 21 and the driven member 18. As a result, the slip control is accomplished in the viscous coupling 21 immediately after the lock-up clutch 26 has been applied, so that the vibrations to be caused by the torque fluctuations are attenuated by the actions of the coil spring 22 and the viscous coupling 21. Thus, the transmission of the vibrations or the like to the power transmission line downstream of the viscous coupling 21 is blocked to prevent the booming noise.

In the half lock-up state, on the other hand, the torque is transmitted while causing a slippage in the viscous coupling 21, so that a stable slipping state is established. Since, moreover, the lock-up clutch 26 does not slip frictionally, the facing member 25 will not wear to eliminate the according reduction in the clutch performance. As a result, an excellent durability can be achieved to prevent the AT oil from being deteriorated and the valve from being caused to stick by the worn powder mixed.

Figure 3:
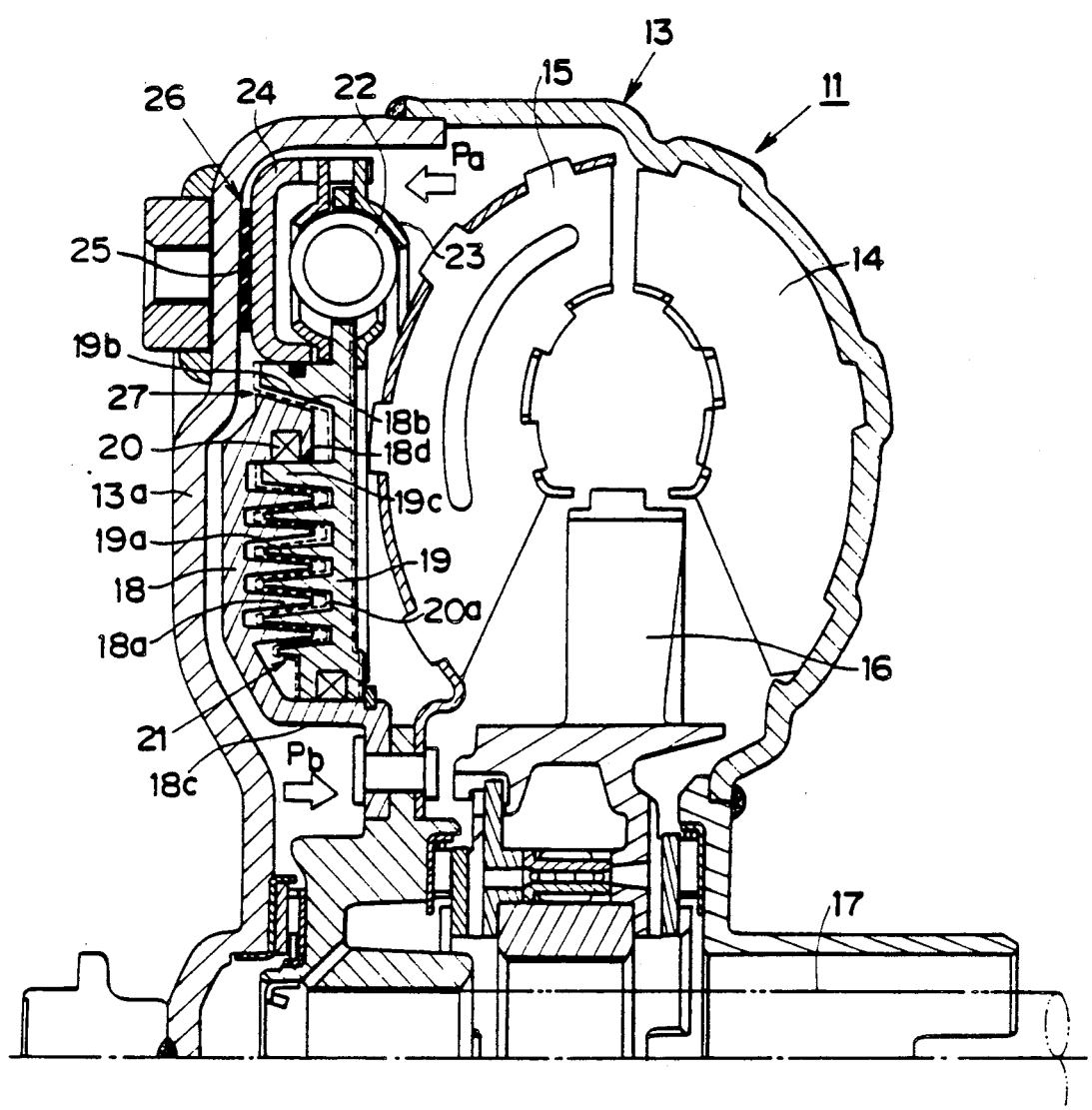

In this half lock-up range, moreover, the torsional damper mechanism including the coil springs 22 and the drive member 19 of the viscous coupling 21 are pushed leftward of FIG. 3 to the positions indicated by dash lines, if the oil pressure Pa in the housing 13 of the torque converter 11 at the side of the turbine runner 15 (at the righthand side of FIG. 2) is raised. As a result, the drive member 19 gets close to the driven member 18 to compress the highly viscous oil, and the charging coefficient is substantially improved to augment the shearing resistance. At the same time, the drive member 19 and the driven member 18 have their individual projections 19a and 18a interleaved deeply. By these multiplied actions, the viscous coupling 21 has its torque transmission capacity augmented to reduce the difference in the rotational speed between the drive member 19 and the driven member 18 so that the coupling state grows more and more direct (as shown in FIG. 3).

Figure 4:
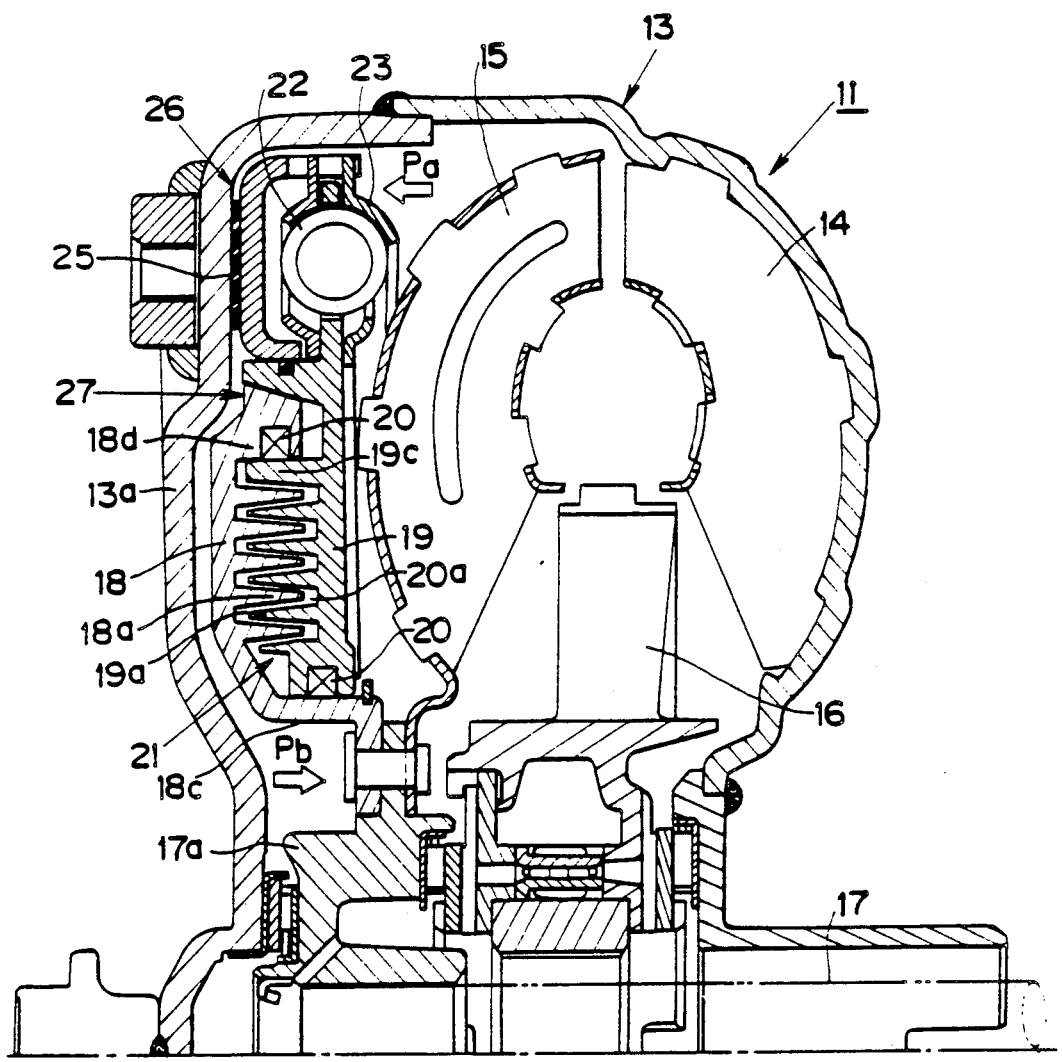

When the vehicle state reaches the lock-up range completely, the oil pressure Pa in the housing 13 at the side of the turbine runner 15 is further boosted to move the aforementioned torsional damper mechanism and the drive member 19 of the viscous coupling 21 further to the left of FIG. 3 so that the cone clutch 27 is engaged (as shown in FIG. 4) by contacting its opposed taper surfaces 19b and 18b which are formed on the circumferential edges of the drive member 19 and the driven member 18. At this time, the pump impeller 14 and the turbine runner 15 of the torque converter 11 are rotating at substantially equal speeds so that the driven member 18 and the drive member 19 of the viscous coupling 21 are also rotating at substantially equal speeds. As a result, the cone clutch 27 can be smoothly engaged without any high slippage so that the so-called "direct connection" is established without any shock. At a high-speed cruising run, moreover, the torque fluctuations are so small that the drivability is not deteriorated by the booming noise generated, even if the cone clutch 27 is directly engaged. Unlike the torque converter having the viscous coupling of the prior art, the viscous coupling of the present invention can be kept away from any slippage at a high-speed run to improve the mileage drastically.

When the vehicle state goes out of the lock-up range, on the other hand, a back pressure Pb rises to a level higher than the oil pressure Pa at the side of the turbine runner 15. As a result, the annular clutch disc 24 leaves the front cover 13a to release the lock-up clutch 26. If an abrupt brake is applied at a run on a snow-covered road, on the other hand, the complete lock-up state is switched directly to the lock-up-off state without passing through the half lock-up state.

In the present embodiment, moreover, the annular clutch disc 24 of the lock-up clutch 26 is formed separately of but movably engaged by the drive member 19. If the clutch disc 24 and the front cover 13a are separated from each other only at their narrow clearance, the lock-up clutch 26 can be released. As a result, there can be attained an excellent advantage that the clutch can be promptly turned off with little stalling of the engine.

Incidentally, the viscous coupling 21 is characterized to have its torque transmission capacity augmented in accordance with the difference in the rotational speed. If, therefore, the external input is so changed that the slippage advances (while increasing the difference in the rotational speed) with the lock-up clutch 26 being engaged, the slippage is decreased in accordance with the change. As a result, the aforementioned torque converter 11 can be easily controlled by the so-called "self-adjustment" thus far described.

Since, moreover, the torque converter 11 can have its torque transmission capacity borne partially by the variable capacity type viscous coupling 21, its maximum torque transmission capacity can be reduced so that it can be small-sized. As a result, there can be attained another advantage that an automatic transmission having the torque converter can be made compact to improve its mountability on the vehicle.

As has been described hereinbefore, the present embodiment is so constructed that the viscous coupling 21 can be completely connected (or locked up) without any slippage while the vehicle is running at a high speed in the lock-up range, thus improving the mileage drastically.

Figure 5:
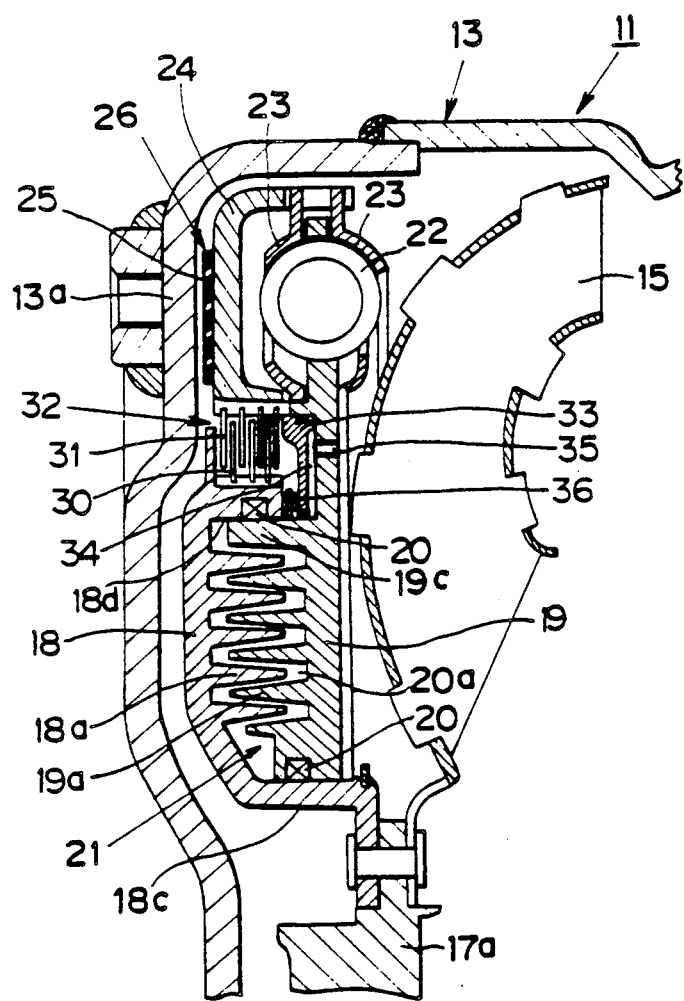
FIG. 5 is a sectional side elevation showing a second embodiment of the present invention.

FIG. 5 shows a second embodiment of the present invention, in which the cone clutch used as a second clutch in the foregoing first embodiment is replaced by a wet type multiple disc clutch. In the description to be made, therefore, the components identical to those of the first embodiment are designated at the common reference numerals, and their detailed descriptions will be omitted.

In the housing 13 of the torque converter 11 equipped with the lock-up mechanism, there is disposed the turbine runner 15, to which the torque of the pump impeller (although not shown) made rotatable integrally with the housing 13 is to be transmitted through the AT oil. The turbine runner 15 is mounted on the hub 17a which is splined to the (not-shown) output shaft. Outside of the turbine runner 15 (i.e., at the lefthand side of FIG. 5), there is disposed the disc-shaped driven member 18 of the viscous coupling 21 such that it can rotate integrally with the turbine runner 15. Between the driven member 18 and the turbine runner 15, on the other hand, there is interposed the annular drive member 19 which is made movable in the axial directions.

Moreover, the disc-shaped driven and drive members 18 and 19 are formed on their respective opposed surfaces with a number of concentric annular projections 18a and 19a, which have toothed sections and are interleaved each other with a clearance. This clearance between the opposed driven and drive members 18 and 19 is filled up with highly viscous oil such as silicone oil to form the variable capacity type viscous coupling 21. If these driven and drive members 18 and 19 get close to each other, the substantial charging coefficient of the highly viscous oil confined in the viscous coupling 21 is increased to augment the shearing resistance. Moreover, the projections 18a and 19a have their clearance narrowed and their lap length enlarged to increase the torque transmission capacity of the viscous coupling 21.

On the circumferential edge of the annular drive member 19, on the other hand, the coil spring 22 of the torsional damper mechanism is so supported by the spring guide plates 23 that it may buffer the rotational fluctuations of the drive member 19 to suppress the vibrations. By the spring guide plates 23, on the other hand, there is supported the annular clutch disk 24 having a C-shaped section, which is allowed to move in the axial directions. Thus, the clutch disc 24 and the front cover 13a of the housing 13 constitute together the lock-up clutch 26.

Moreover, a plurality of friction plates 30 and 31 are so splined to the respective circumferential edges of the driven member 18 and the drive member 19 constituting the viscous coupling 21 that they are allowed to move in the axial directions, thus constituting a wet type multiple disc clutch 32.

On the drive member 19, still moreover, there is fitted an axially slidable pressure plate 33 which is opposed to the aforementioned friction plates 30 and 31 to form an oil pressure chamber 34 at its back, i.e., at the opposite side to the friction plates 30 and 31. The drive member 19 is formed at a portion perpendicular to the axis thereof with an oil passage 35 for providing communication between the side of the torque converter 11 and the oil pressure chamber 34. On the front side of the pressure plate 33, there is mounted a return spring 36 for returning the pressure plate 33.

Next, the operations of this embodiment thus constructed will be described in the following.

When the vehicle is in a state other than the lock-up range, the output of the engine is transmitted, when it is inputted to the torque converter 11, from the pump impeller to the turbine runner 15 through the AT oil, until it is outputted to the output shaft (although not shown) while having cut off its vibrations due to the torque fluctuations of the engine.

Like the case of the foregoing first embodiment, the oil pressure at the side of the torque converter 11 is boosted when the vehicle state reaches the half lock-up range. Then, the annular clutch disc 24 is pushed and moved leftward of FIG. 5 so that it comes into contact with the front cover 13a to engage the lock-up clutch 26.

When the lock-up clutch 26 is engaged, the torque is transmitted from the drive member 19 of the viscous coupling 21 through the coil spring 22 of the torsional damper mechanism, while having its vibrations buffered by the coil spring 22, and further through the highly viscous oil in the variable capacity type viscous coupling 21 to the driven member 18.

In the lock-up state, the clearance between the drive and driven members 19 and 18 of the viscous coupling 21 is wide in such a portion of the half lock-up range of the vehicle state that the engine torque fluctuations are high as at a low vehicle speed or at a high degree of throttle opening. Because of small torque transmission capacity, therefore, the slippage control is performed to cut the vibrations or the like due to the fluctuations of the torque transmitted. As a result, the vibrations or the like are prevented from being transmitted to the power transmission system downstream of that viscous coupling 21.

If the oil pressure in the housing 13 is higher at the side of the turbine runner 15 than that at the drive member 19, this member 19 is pushed leftward of FIG. 5 to narrow the clearance from the driven member 18 thereby to boost the pressure of the highly viscous oil confined in the clearance. As a result, the substantial charging coefficient of the oil is increased to augment the shearing resistance so that the torque transmission capacity is augmented to come toward that of the direct connection, as in the foregoing embodiment.

When the vehicle state reaches the complete lock-up range, the oil pressure at the side of the turbine runner 15 is further raised to a higher level than that at the drive member 19 so that the drive member 19 is further moved leftward of FIG. 5. As a result, the friction plates 30 and 31 of the multiple disc clutch 32 are pushed toward the front cover 13a by the pressure plate 33 of the drive member 19.

As a result, the friction plates 30 and 31 arranged alternately of each other are forced to contact with each other so that the multiple disc clutch 32 is engaged. Since, at this time, the driven member 18 and the drive member 19 are rotating at substantially equal speeds, the multiple disc clutch 32 is applied with neither any slippage nor shocks.

In the complete lock-up range, on the other hand, there is established the direct connection, in which the drivability is not deteriorated because of the low torque fluctuations. Unlike the torque converter having the viscous coupling of the prior art, moreover, the viscous coupling will not slip at a high speed run. As a result, the mileage can be remarkably improved while retaining the operations and effects of the foregoing first embodiment.

Figure 6:
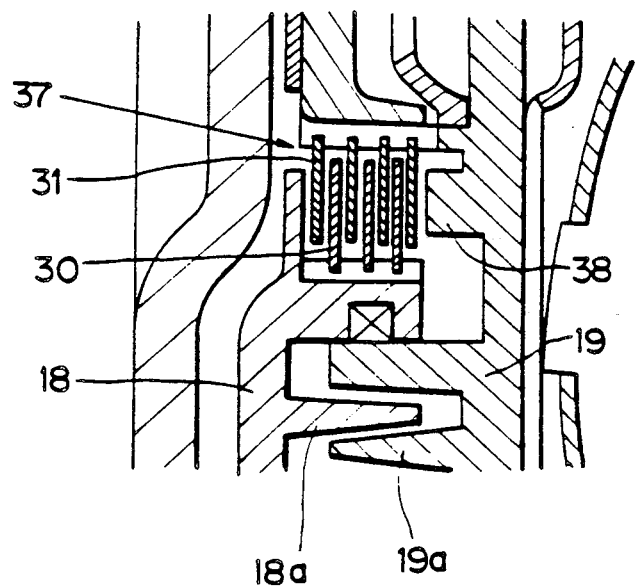
FIG. 6 is an enlarged section showing an essential portion of another embodiment.

FIG. 6 shows still another embodiment of the present invention. In the foregoing second embodiment, the pressure plate 33 of the multiple disc clutch 32 applies the clutch by pushing the friction plates 30 and 31. In this third embodiment, on the contrary, a multiple disc clutch 37 has its drive member 19 formed with an annular ridge 38 in a position opposed to the friction plates 30 and 31. When the clearance between the driven member 18 and the drive member 19 is narrowed, the friction plates 30 and 31 are pushed to contact with each other by the annular ridge 38 thereby to engage the multiple disc clutch 37. As a result, it is possible to attain the operations and effects similar to those of the foregoing embodiments.

In the aforementioned individual embodiments, the variable capacity type viscous coupling is taken as an example of the slippage torque transmission mechanism in the present invention. Despite of this fact, however, the present invention can also be applied to either an invariable capacity type viscous coupling such as a torque transmission mechanism having a constant torque transmission capacity or a slippage torque transmission mechanism other than the viscous coupling.

In the foregoing first embodiment, the cone clutch 27 is engaged by moving the drive member 19 toward the driven member 18 while compressing the viscous fluid and the air confined in the chamber 20a. When these viscous fluid and air expand to build up the internal pressure of the chamber 20, the pressure Pa at the side of the turbine runner 15, which is required for engaging the cone clutch 27, is also boosted. In other words, the timing for engaging the cone clutch 27 is delayed because this clutch 27 is left disengaged until the pressure Pa at the side of the turbine runner 15 is raised to a sufficiently high level.

The embodiments to be described hereinafter are constructed to eliminate the delay of that engaging timing of the cone clutch.

Figure 7:
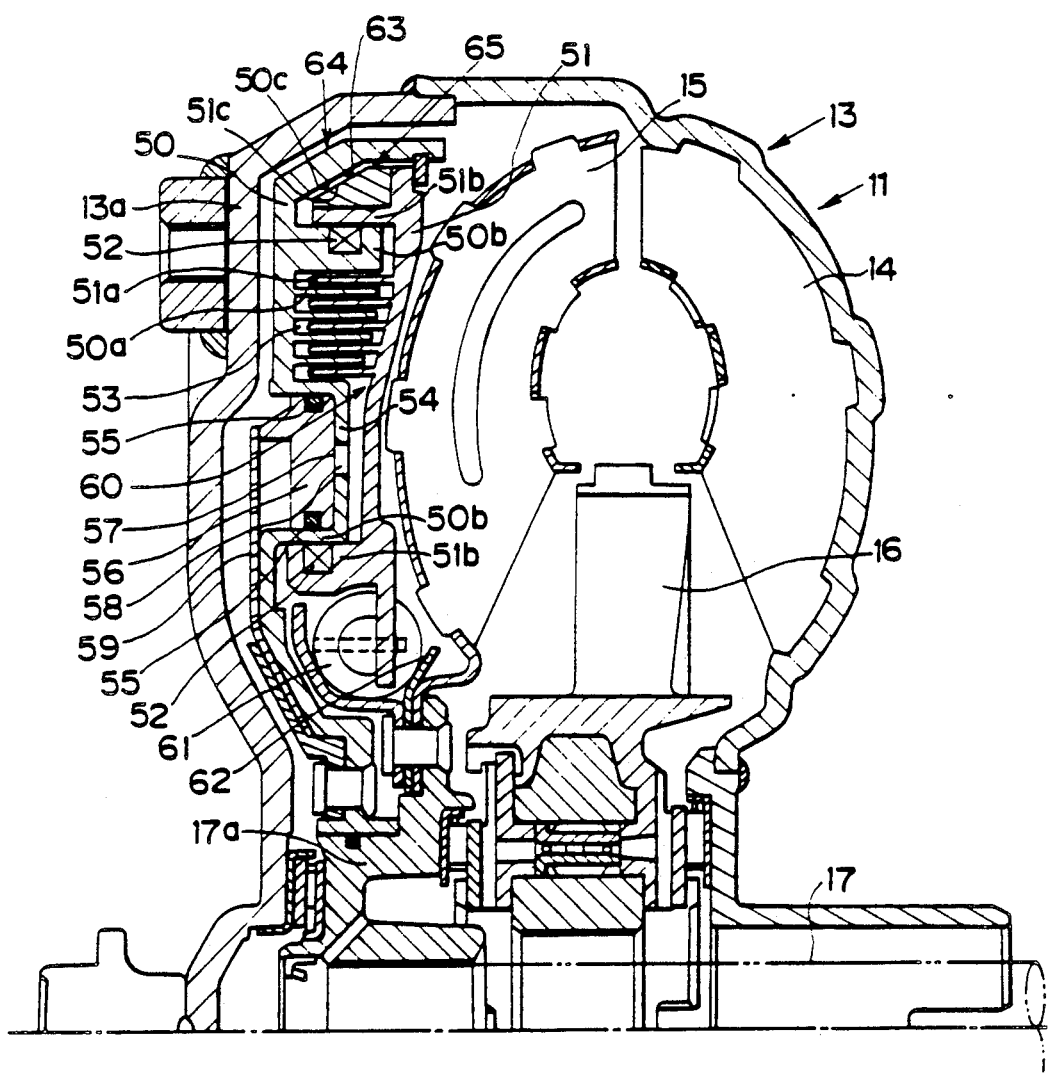
FIG. 7 is a sectional side elevation showing still another embodiment of the present invention.

In FIG. 7, the torque converter 11 equipped with the lock-up mechanism has its housing 13 formed of the front cover 13a and the casing of the pump impeller 14. In this housing 13, there are disposed the turbine runner 15 for receiving the torque from the pump impeller 14 through the AT oil, and the stator 16 for adjusting the direction, in which the AT oil charged in the inside of the housing 13 is to flow. Moreover, the turbine runner 15 is fixed on the hub 17a splined to the output shaft 17. In the hub 17a, there is fixed an annular first clutch member 50 which is allowed to move in axial directions between the turbine runner 15 and the front cover 13a.

Between the first clutch member 50 and the turbine runner 15, on the other hand, there is disposed an annular second clutch member 51 which is also allowed to move in the axial directions. Moreover, the second clutch member 51 and the first clutch member 50 are formed on their opposed surfaces with a number of concentric projections 51a and 50a which are interleaved but can be fitted on each other.

The second clutch member 51 is formed, at its inner circumferential portion and outer portion than the projections 51a, with cylinder portions 51b and 51b which are protruded toward the first clutch member 50. The first clutch member 50 has its cylinder portions 50b fitted slidably in those cylinder portions 51b. These sliding portions are sealed up by an oil seal 52 to define a chamber 53 by the cylinder portions 50b and 51b. Moreover, the first clutch member 50 is partially recessed at the side of the chamber 53 to form a recess 54, in which a piston member 56 sealed up with an oil seal 55 is fitted slidably to form a sub-chamber 57. This sub-chamber 57 and the chamber 53 are communicated by way of an oil passage 58 which is formed in the first clutch member 50. This first clutch member 50 is equipped with a leaf spring 59 for pushing the piston member 56 deeply into the inside of the sub-chamber 57. These sub-chamber 57, piston member 56 and leaf spring 59 constitute altogether a pressure absorbing mechanism. In this pressure absorbing mechanism, the piston member 56 is moved, when the internal pressure of the chamber 53 rises, to augment the volume of the sub-chamber 57, i.e., the substantial volume of the chamber 53 so that the internal pressure of the chamber 53 may be kept at a constant level.

Moreover, the chamber 53 is filled up with not only the highly viscous oil such as silicone oil but also a proper amount of air to constitute a variable capacity type viscous coupling 60.

On the inner circumferential edge of the second clutch member 51, on the other hand, there are mounted a plurality of coil springs 61 acting as the torsional damper mechanism, which are supported by a spring guide plate 62 to buffer the rotational fluctuations of the second clutch member 51 thereby to suppress the vibrations. Facing members 63 are adhered to the outer and inner surfaces of the outer circumferential edges of the first clutch member 50. Thus, the first clutch member 50 and the front cover 13a of the housing 13 constitute together a first clutch 64.

The ON/OFF of the first clutch 64 is hydraulically controlled on the basis of a predetermined lock-up map.

When the half lock-up range is reached, the oil pressure at the side of the turbine runner 15 is raised to push the first clutch member 50 so that this member 50 engages with the inner surface of the front cover 13a to apply the first clutch 64.

In this half lock-up range, the torque being transmitted through the torque converter 11 is partially transmitted, if the first clutch 64 is engaged, directly to the first clutch member 50. As a result, the torque is transmitted through the highly viscous oil to the second clutch member 51 to rotate the output shaft 17. At the same time, the viscous coupling 60 slips to attenuate the vibrations or the like, even if the engine torque fluctuates, so that the transmission of the vibrations or the like to the power transmission system downstream of that viscous coupling 60 is suppressed.

Moreover, the second clutch member 51 and the first clutch member 50 have their respective circumferential edges formed with opposed taper surfaces 51C and 50C, which form together a second clutch 65 when they are mechanically engaged. This second clutch 65 can connect the second clutch member 51 and the first clutch member 50 mechanically without any slippage.

Next, the operations of the embodiment thus constructed will be described in the following with reference to FIGS. 7 to 9.

When the engine torque is transmitted to the front cover 13a, the pump impeller 14 is rotated to transmit the torque to the turbine runner 15 through the AT oil. As in a range such as at a low-speed run or in an acceleration other than the lock-up range, the torque is transmitted through the AT oil, and the torque converter 11 slips to generate heat if the engine torque fluctuates. Moreover, the torque fluctuations are attenuated to block the transmission of the vibrations or the like to the power transmission system downstream of the torque converter 11.

Figure 8:
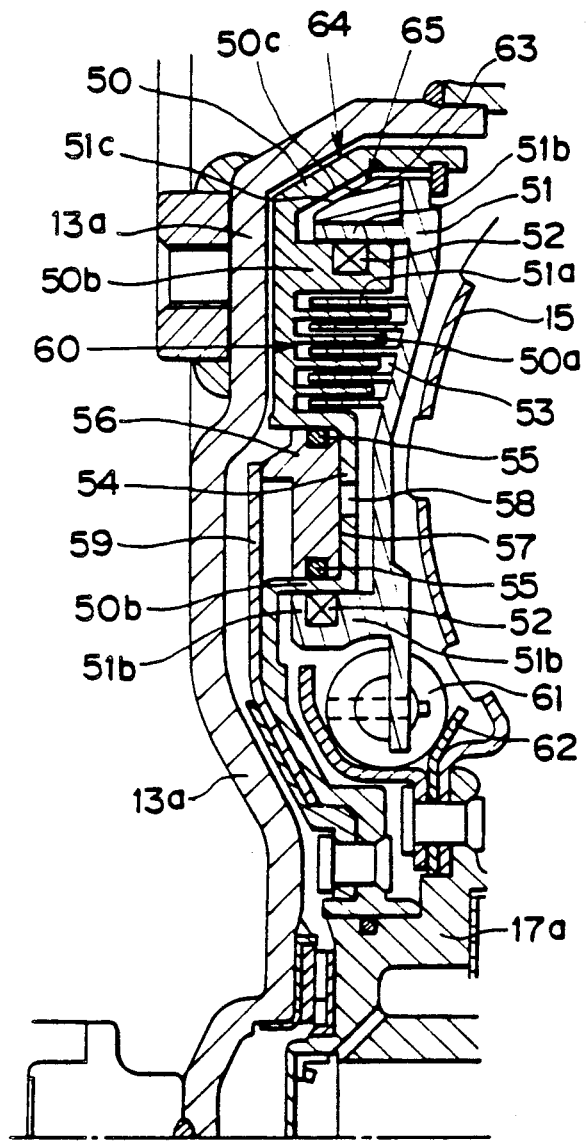
FIGS. 8 and 9 are sections for explaining the operations of the embodiment shown in FIG. 7.
Figure 9:
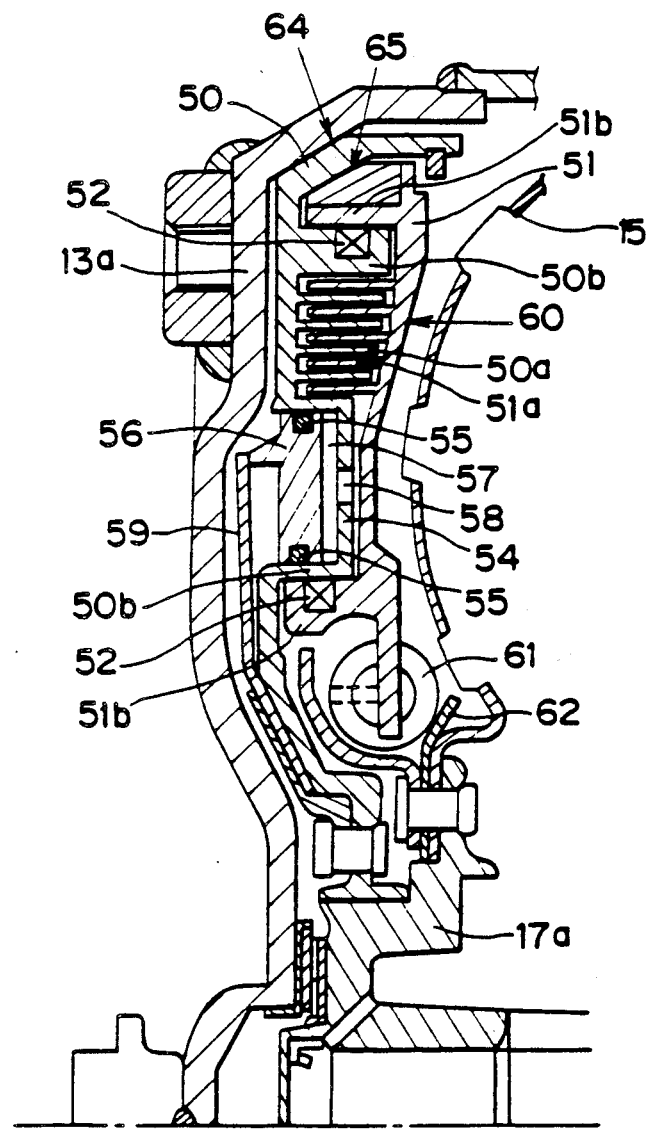

When the half lock-up range is reached as the vehicle speed is lightly increased or as the degree of throttle opening is slightly decreased, the oil pressure at the side of the turbine runner 15 is boosted to push the first clutch member 50 at first to the left of FIG. 7 so that the facing members 63 adhered to the first clutch member 50 are pressed onto the inner circumferential edge of the front cover 13a to apply the first clutch 64 (as shown in FIG. 8).

When the first clutch 64 is thus engaged, the torque is transmitted from the front cover 13a to start the rotation of the first clutch member 50. This rotation is transmitted through the highly viscous oil in the variable capacity type viscous coupling 60 to the second clutch member 51 until it is outputted to the output shaft 17. As a result, the slip control is accomplished in the half lock-up range by the viscous coupling 60 so that the vibrations or the like due to the torque fluctuations of the engine are reduced by the actions of the coil spring 61 and the viscous coupling 60. Thus, the transmission of the vibrations or the like to the power transmission system downstream of the viscous coupling 60 can be blocked to prevent the booming noise from being generated.

When the engine torque is transmitted to the second clutch member 51 through the highly viscous oil in the variable capacity type viscous coupling 60, the highly viscous oil between the first and second clutch members 50 and 51 is sheared by the projections 50a and 51a to generate the heat.

Due to the heat generated by the slippage of the torque converter 11 and by the relative rotations in the viscous coupling 60, the temperatures in the housing 13 and the viscous coupling 60 are raised. As a result, the air and the highly viscous oil in the viscous coupling 60 are expanded. At this time, the piston member 56 in the sub-chamber 57 is moved against the biasing force of the leaf spring 59 in the direction to enlarge the volume of the sub-chamber 57 so that the expansions of the air and highly viscous oil in the chamber 53 can be absorbed to keep the pressure of the inside of the viscous coupling at a substantially constant level at all times.

By enlarging the volume of the sub-chamber 57, moreover, the large expansions, if any, of the air and highly viscous oil can be sufficiently absorbed to keep the pressure in the chamber 53 at a substantially constant level at all times.

When the vehicle state comes into the complete lock-up range, the oil pressure in the housing 13 at the side of the turbine runner 15 is further boosted. Then, the second clutch member 51 is moved leftward of FIG. 8. Then, the volume of the chamber 53 is reduced. In order to compensate this reduction, the volume of the sub-chamber 57 is increased against the biasing force of the leaf spring 59 till the surfaces 50c and 51c formed on the respective circumferential edges of the first and second clutch members 50 and 51 and opposed to the second clutch 65 are engaged to apply the second clutch 65 (as shown in FIG. 9). As a result, the slippage of the viscous coupling 60 is blocked to eliminate the torque transmission loss thereby to improve the mileage. Since the pressure in the viscous coupling 60 is always at a substantially constant level, the pressure at the turbine side for applying the second clutch 65 may always be at a constant level, and the engagement of the second clutch 65 is not delayed but stably timed to improve the mileage. Since, moreover, the pressure for applying the second clutch 65 is always constant, it is possible to prevent the clutch capacity from dropping due to the temperature rise.

Figure 10:
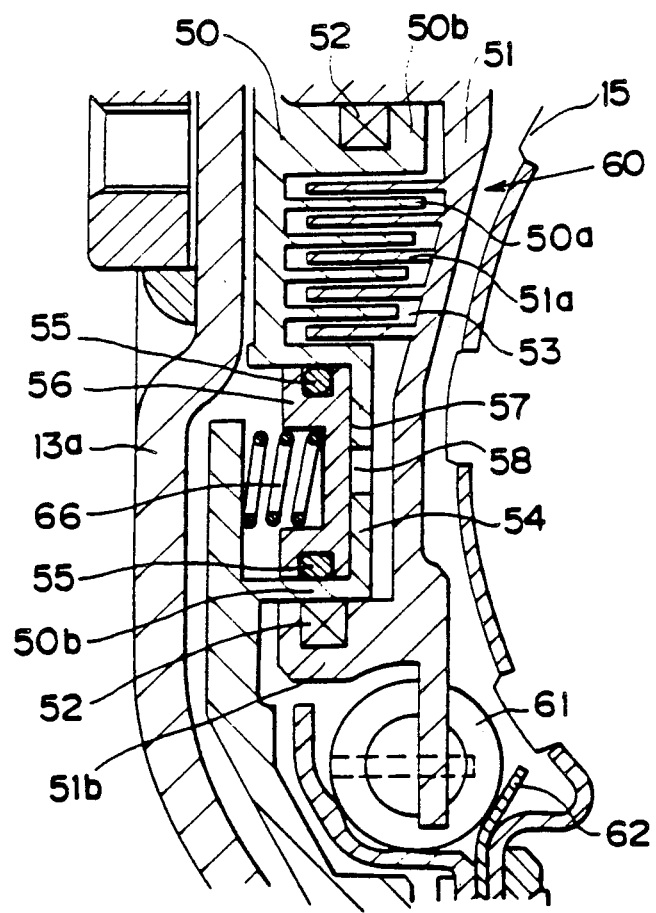
FIG. 10 is a section showing another example of a pressure absorbing mechanism.

FIG. 10 shows another example of the pressure absorbing mechanism, in which the elastic member for urging the piston member 56 forming the sub-chamber 57 is exemplified by a coil spring 66. The remaining structure is identical to that of the embodiment shown in FIG. 7, and its identical or corresponding portions are designated at the common reference numerals.

Figure 11:
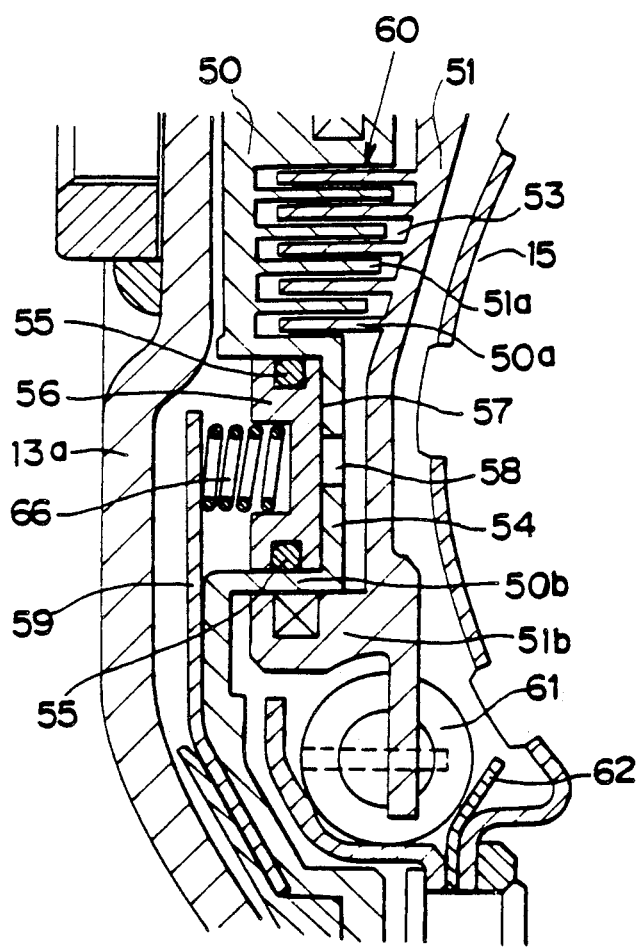
FIG. 11 is a section showing still another example of the pressure absorbing mechanism.
Figure 12:
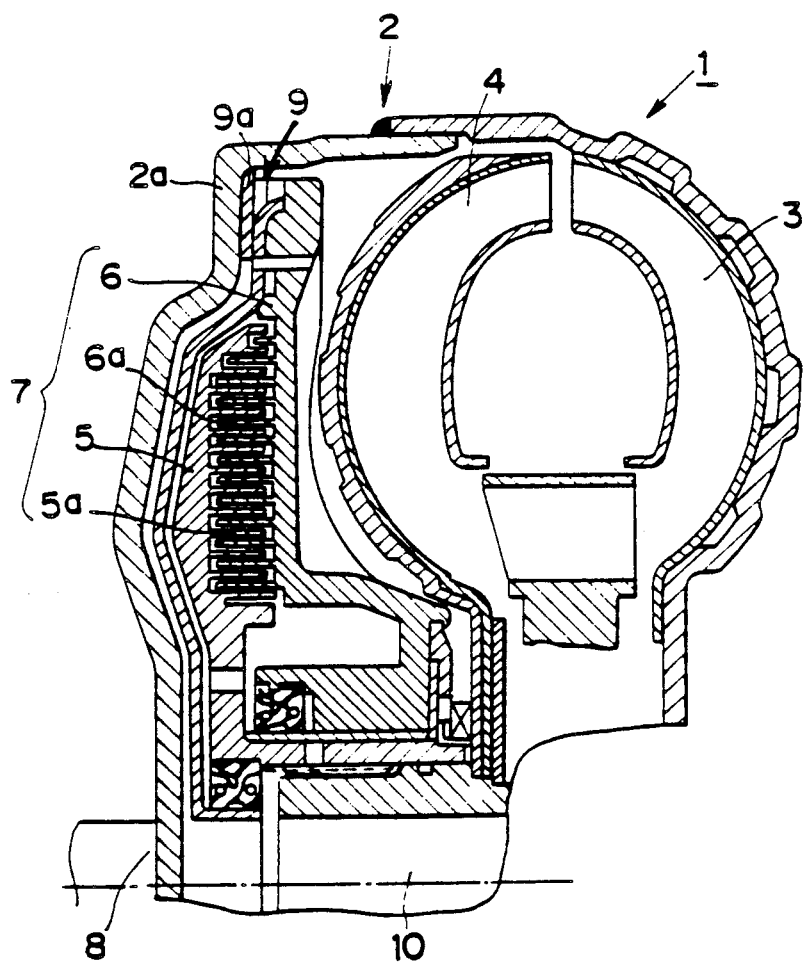
FIG. 12 is a partially cut-away, sectional side elevation showing the torque converter with the viscous coupling of the prior art.

FIG. 11 shows still another example of the pressure absorbing mechanism, in which the elastic member for urging the piston member 56 forming the sub-chamber 57 is exemplified by the leaf spring 59 and the coil spring 66. The remaining structure is identical to those of the foregoing individual embodiments, and its identical or corresponding portions are designated at the common reference numerals.

The present invention has been described hereinbefore in connection with the specifically shown embodiments. However, the present invention should not be limited to such embodiments but can be modified in various manners within the scope thereof.

For example, the present invention can be applied to the torque converters of the aforementioned individual embodiments even if they are of the fluid coupling type.

In the aforementioned individual embodiments, moreover, the sub-chamber is provided as the means for augmenting the volume of the chamber. However, the present invention can be modified by means for augmenting the volume of the oil chamber by forming it of an elastic deformable material or the like.

Although the viscous coupling of the aforementioned individual embodiments is filled up with the highly viscous oil such as the silicone oil and a proper amount of air, the present invention can be applied to the viscous coupling filled up only with the highly viscous oil. In this modification, the application of the first clutch is effected not only by controlling the oil pressure at the side of the turbine runner but also by controlling the oil pressure between the front cover and the first clutch. Since no air is present in the viscous coupling, the second clutch would not be applied before the first clutch by such air in the coupling as might otherwise be compressed. In either oil pressure control, therefore, the first clutch is pushed at first onto the front cover, and then the second clutch can be engaged to transmit the torque from the front cover acting as the input element to the output shaft acting as the output element.

Since, moreover, the charging coefficient in the viscous coupling is drastically improved, the transmission torque capacity can be augmented to reduce the size of the viscous coupling accordingly.

Still moreover, the viscous coupling may be filled up with the highly viscous oil only so that the charging coefficient of the air need not be considered to improve the assembling efficiency.

According to the present invention, the second clutch to be engaged after the lock-up clutch is arranged in parallel relationship with the viscous coupling so that the power transmission loss at a high-speed cruising run can be prevented to improve the mileage.

In case, on the other hand, the viscous fluid of the viscous coupling is compressed when the second clutch is to be engaged, it can be relieved to the sub-chamber to suppress its pressure rise thereby to stabilize the timing of engaging the second clutch to a constant value.

What is claimed is:

1. A fluid power transmission comprising:
   a pump impeller;
   a turbine runner;
   a housing accommodating said pump impeller and said turbine runner;
   a lock-up clutch adapted to be engaged with and released from a first member integrated with said pump impeller; and
   a viscous coupling including an annular drive member and an annular driven member for transmitting torque, through viscous fluid, between said drive and driven members, said drive member being connected to said lock-up clutch, and said driven member being connected to a second member integrated with said turbine runner,
   wherein the improvement comprises clutch means engageable, after said lock-up clutch has been engaged, to connect said drive member and said driven member mechanically.

2. A fluid power transmission according to claim 1,
   wherein said clutch means includes: a first taper surface formed on said drive member; and a second taper surface formed on said driven member, and
   wherein said first taper surface and said second taper surface are brought into engagement with each other when said drive member and said driven member get close to each other.

3. A fluid power transmission according to claim 2,
   wherein said second taper surface is formed on an outer circumference of said driven member, and
   wherein said first taper surface is so formed on said drive member as to face said second taper surface.

4. A fluid power transmission according to claim 2,
   wherein said driven member has a cylinder portion at its inner circumference and said second taper surface on its outer circumference and is so connected to said second member as to move in axially, and
   wherein said drive member is so fitted in said cylinder portion as to move in axially directions and has said first taper surface at a portion opposed to said second taper surface.

5. A fluid power transmission according to claim 2,
   wherein said viscous coupling includes a plurality of annular projections projecting at a circumferentially inner side relative to said taper surfaces and projecting from opposed surfaces of said drive member and said driven member and having at least one of their inner and outer circumferences tapered so that they are fitted on each other at a predetermined clearance in-between, and
   wherein said clearance is filled up with said viscous fluid.

6. A fluid power transmission according to claim 2, further comprising a damper mechanism interposed between a portion of said drive member at a circumferentially outer side than said first taper surface and said lock-up clutch.

7. A fluid power transmission according to claim 2,
   wherein said first member includes a front cover connected to said pump impeller and arranged at the opposite side to said pump impeller across said turbine runner,
   wherein said lock-up clutch and said drive member are so interposed between said turbine runner and said front cover as to move toward and apart from said front cover,
   wherein said driven member is so interposed between said drive member and said front cover as not to move in the axial directions,
   wherein said second taper surface is formed on the outer circumference of said driven member, and
   wherein said first taper surface is so formed on said drive member as to engage with said second taper surface after said lock-up clutch has moved together with said drive member toward said front cover to engage with said front cover.

8. A fluid power transmission according to claim 5, further comprising: a first cylinder portion formed at the circumferential inner side of said driven member; a second cylinder portion formed at a circumferentially outer side than said first cylinder portion; a third cylinder portion formed in said drive member and slidably fitted on the outer circumference of said first cylinder portion; and a fourth cylinder portion formed in said drive member and adapted to be slidably fitted in the inner circumference of said second cylinder portion,
   wherein said annular projections are formed between said first cylinder portion and said second cylinder portion and between said third cylinder portion and said fourth cylinder portion.

9. A fluid power transmission according to claim 1,
   wherein said clutch means includes: an annular first friction plate mounted on said drive member; a second friction plate arranged alternately of said first friction plate and mounted on said driven member; and push means for pushing said first friction plate and said second friction plate into frictional contact with each other.

10. A fluid power transmission according to claim 9,
    wherein said push means includes: a pressure plate movable back and forth with respect to said first friction plate and said second friction plate; an oil pressure chamber formed at the opposite side to said first friction plate and said second friction plate across said pressure plate; and a return spring for pushing said pressure plate toward said oil pressure chamber.

11. A fluid power transmission according to claim 10,
    wherein said driven member has a cylinder portion at its inner circumferential portion and its outer circumferential portion splining said first friction plate and is so connected to said second member as not to move in the axial direction, and
    wherein said drive member has a fifth cylinder portion, which has a larger diameter than that of said driven member and splines said second friction plate, and is so fitted in said cylinder portion as to move in the axial directions.

12. A fluid power transmission according to claim 10,
    wherein said first member includes a front cover connected to said pump impeller and arranged at the opposite side to said pump impeller across said turbine runner,
    wherein said lock-up clutch and said drive member are so interposed between said turbine runner and said front cover as to move toward and apart from said front cover,
    wherein said driven member is so interposed between said drive member and said front cover as not to move in the axial directions, wherein said first friction plate and said second friction plate are arranged closer to said front cover than said pressure plate, and wherein said oil pressure chamber is formed between said pressure plate and a portion of said drive member, which is formed with an oil passage.

13. A fluid power transmission according to claim 11, wherein said viscous coupling includes: annular first projections projected from the cylinder portion and the outer circumference of said driven member toward said drive member and having one of their inner and outer circumferences tapered; and annular second projections formed on said drive member to have one of their inner and outer circumferences tapered to be interleaved on said first projections with a clearance, and wherein the clearance between said projections is filled up with said viscous fluid.

14. A fluid power transmission according to claim 9, further comprising a damper mechanism interposed between said drive member and said lock-up clutch.

15. A fluid power transmission according to claim 9, wherein said push means includes projections formed on said drive member and projected toward said first friction plate and said second friction plate, wherein said driven member has a cylinder portion at its inner circumferential portion and its outer circumferential portion splining said first friction plate and is so connected to said second member as not to move in the axial direction, and wherein said drive member has a fifth cylinder portion, which has a larger diameter than that of said driven member and splines said second friction plate, and is so fitted in said cylinder portion as to move in the axial directions.

16. A fluid power transmission according to claim 1, wherein said viscous coupling includes a chamber defined by said drive member and said driven member, and wherein said chamber is filled up with said viscous fluid and a predetermined amount of gas.

17. A fluid power transmission according to claim 16, wherein said viscous coupling further includes a plurality of annular projections formed on said drive member and said driven member, respectively, toward said chamber and are interleaved with each other with a clearance.

18. A fluid power transmission according to claim 16, further comprising a pressure absorbing mechanism for suppressing a rise in the internal pressure of said chamber by augmenting a substantial volume of said chamber.

19. A fluid power transmission according to claim 18, wherein said pressure absorbing mechanism includes:
a sub-chamber communicating with said chamber;
a piston member fitted in said sub-chamber; and an elastic member for pushing said piston member in a direction to reduce the volume of said sub-chamber.

20. A fluid power transmission according to claim 19, wherein said elastic member includes a leaf spring.

21. A fluid power transmission according to claim 19, wherein said elastic member includes a coil spring.

22. A fluid power transmission according to claim 19, wherein said sub-chamber includes: an annular recess formed by recessing a portion of said drive member toward said chamber; and said piston member fitted in said recess.

23. A fluid power transmission according to claim 19, wherein said first member includes a front cover connected to said pump impeller and arranged at an opposite side to said pump impeller across said turbine runner, wherein said lock-up clutch and said drive member are so interposed between said turbine runner and said front cover as to move toward and apart from said front cover, and wherein said driven member is so interposed between said drive member and said turbine runner as to move toward and away from said drive member.

24. A fluid power transmission according to claim 1, further comprising a damper mechanism interposed between said driven member and said second member.

25. A fluid power transmission according to claim 1, wherein said viscous coupling includes: a plurality of annular third projections formed on said drive member toward said driven member; and annular fourth projections formed on said drive member and interleaved on said third projections with a clearance, and wherein the clearance between said projections is filled up with said viscous fluid.

26. A fluid power transmission according to claim 25, wherein either of the inner and outer circumferences of said third projections or said fourth projections are tapered.

* * * * *

UNITED STATES PATENT AND TRADEMARK OFFICE
CERTIFICATE OF CORRECTION

PATENT NO. : 5,125,486

DATED : June 30, 1992

INVENTOR(S) : Kiyohito Murata

It is certified that error appears in the above-identified patent and that said Letters Patent is hereby corrected as shown below:

| Column | line | |
|---|---|---|
| 1 | 13 | After "avoided" insert --,--; change "to lose the" to --resulting in a loss of--. |
| 1 | 23 | Change "to improve" to --thereby improving--. |
| 1 | 53 | Change "the" to --a--. |
| 1 | 54 | Change "is one for" to --is designed to--. |
| 1 | 55 | Change "transmitting" to --transmit--. |
| 1 | 56 | Change "This" to --Such--. |
| 1 | 57 | Change "representative" to --a mechanism--. |
| 2 | 28 | Change "prevented to prevent" to --eliminated, thereby preventing--. |

UNITED STATES PATENT AND TRADEMARK OFFICE
CERTIFICATE OF CORRECTION

PATENT NO. : 5,125,486

DATED : June 30, 1992

INVENTOR(S) : Kiyohito Murata

It is certified that error appears in the above-identified patent and that said Letters Patent is hereby corrected as shown below:

| Column | line | |
|---|---|---|
| 2 | 38 | Before "this" delete "of". |
| 4 | 53 | After "applied" insert --in--. |
| 5 | 54 | After "wear" insert --,--. |
| 5 | 55 | Replace "to eliminate the according" with --thereby eliminating the resulting--. |
| 7 | 35 | After "leaved" insert --with--. |
| 9 | 24 | After "Despite" delete "of''. |
| 9 | 66 | Change "than" to --from--. |
| 11 | 9 | Change "lightly" to --slightly--. |
| 13 | 45 | Delete "directions". |

Signed and Sealed this

Fifth Day of October, 1993

*Attest:*

BRUCE LEHMAN

*Attesting Officer*    Commissioner of Patents and Trademarks